United States Patent [19]

McMurray

[11] Patent Number: 4,611,267

[45] Date of Patent: Sep. 9, 1986

[54] SNUBBER ARRANGEMENTS WITH ENERGY RECOVERY FOR POWER CONVERTERS USING SELF-EXTINGUISHING DEVICES

[75] Inventor: William McMurray, Schenectady, N.Y.

[73] Assignee: General Electric Company, Schenectady, N.Y.

[21] Appl. No.: 705,259

[22] Filed: Feb. 25, 1985

[51] Int. Cl.[4] ............................................. H02M 7/125
[52] U.S. Cl. ........................................... 363/58; 363/27
[58] Field of Search .................. 363/17, 27, 56, 57, 363/58, 98; 361/35, 39, 40

[56] References Cited

U.S. PATENT DOCUMENTS 4,328,538  5/1982  Pollmeier ........................... 363/56
4,336,587  6/1982  Boettcher, Jr. et al. ............ 363/134

OTHER PUBLICATIONS

T. Asaeda et al., "DC-to-AC Power Converter for Fuel Cell System", Conference Record of Fifth International Telecommunications Energy Conference, Oct. 1983, pp. 84–91.

Primary Examiner—Patrick R. Salce
Assistant Examiner—Anita M. Ault
Attorney, Agent, or Firm—Mark L. Mollon; James C. Davis, Jr.; Marvin Snyder

[57] ABSTRACT

Energy trapped in the snubbers connected to a dc-ac power converter is more efficiently restored to the dc source by means of an energy recovery transformer with a reset circuit branch for improving the reset of the transformer following a period of energy recovery. The reset circuit branch damps out oscillations between the recovery transformer and the overcharged shunt capacitive snubber and may also be used to dissipate the magnetizing current of the energy recovery transformer.

8 Claims, 7 Drawing Figures

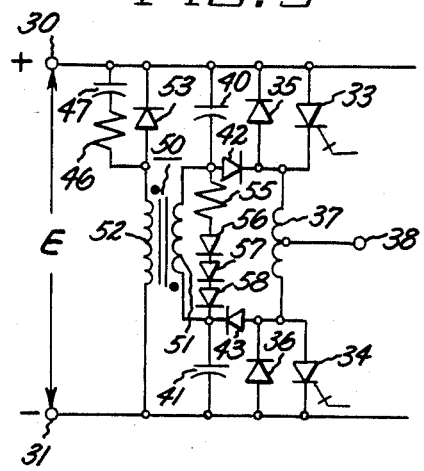
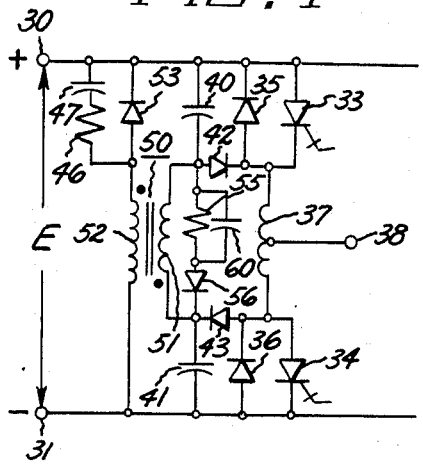
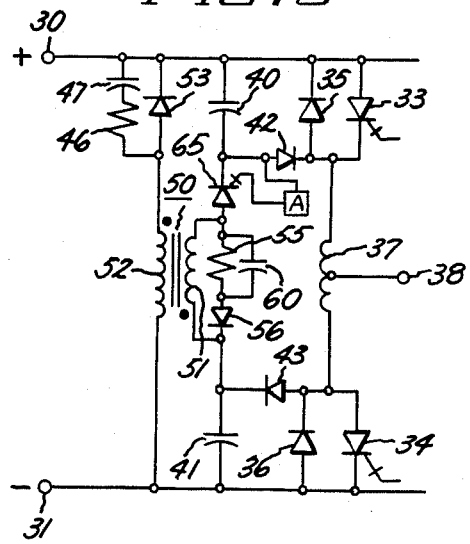
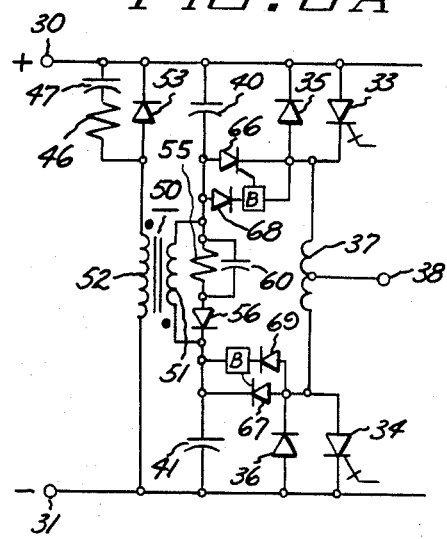
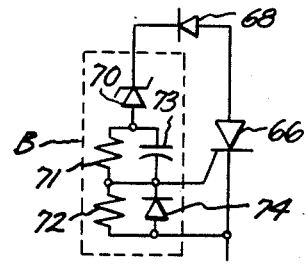

SNUBBER ARRANGEMENTS WITH ENERGY RECOVERY FOR POWER CONVERTERS USING SELF-EXTINGUISHING DEVICES

The present invention relates in general to snubber arrangements wherein snubber energy is returned to the dc supply through a recovery transformer and more specifically to the resetting of the recovery transformer following a period of energy recovery.

BACKGROUND OF THE INVENTION

DC to AC power converters are known which use two switching devices connected in series in each leg of the converter, the junction of each series-connected pair of switching devices comprising an output of the converter. Such a converter has been used in adjustable speed ac motor drives where a pulse width modulated three-phase bridge inverter supplies a voltage of adjustable amplitude and frequency to a motor.

The use of a self-extinguishing power semiconductor device such as a gate turn-off thyristor (GTO) or a high power transistor in a power converter requires both a series inductive snubber to limit the rate of change of current with respect to time (di/dt) when turning on and a shunt capacitive snubber to limit the rate of change of voltage with respect to time (dv/dt) when turning off. After switching (either the turning on or turning off of either switching device of the leg), energy is trapped in the snubber elements. In the prior art, this energy is usually discharged through resistors. It is also known to recover some of the snubber energy, as described in a paper by A. Ferraro, "An Overview of Low Loss Snubber Technology for Transistor Converters", Conference Record IEEE Power Electronics Specialists Conference, 1982, pages 466–477.

It is also known to recover trapped snubber energy via a single transformer such that the transformer is loaded only during commutation transients. This transformer can be relatively small and can employ an iron core so that the two windings can be reasonably well coupled, thus improving the efficiency of energy recovery. However, in the known configurations of the recovery transformer, the reset time, which is the time it takes the flux in the transformer to reduce to zero, is so long as to impose an unacceptable upper limit on the frequency at which the transformer can operate. If the transformer is not reset by the next commutation, it will saturate. As a result, the snubber energy will remain trapped as a high magnetizing current circulating through the snubber inductance and the saturated primary winding of the transformer until it is dissipated by losses. Thus, little if any energy would be recovered.

OBJECTS OF THE INVENTION

It is a principal object of the present invention to provide a new and improved method for restoring snubber energy to the dc supply in a dc to ac power converter.

It is a further object of the present invention to provide a method for improving the reset time of the recovery transformer in a dc to ac power converter.

It is another object of the present invention to provide a new and improved apparatus for resetting the recovery transformer in a dc to ac power converter.

SUMMARY OF THE INVENTION

These and other objects are achieved by a method for restoring snubber energy in a leg of a power converter to the dc supply following a commutation in the leg. The leg includes first and second switching devices coupled in series and first and second feedback diodes coupled in anti-parallel with the first and second switching devices, respectively. First and second series inductive snubbers and first and second shunt capacitive snubbers are connected to the first and second switching devices, respectively. A recovery transformer couples the snubbers to the dc supply. The leg further includes first and second unidirectional conducting devices which polarize the charging and discharging of the snubbers. The method comprises the steps of transferring energy from the snubbers to the dc supply through the recovery transformer, damping out oscillations between the recovery transformer and the one of the first and second shunt capacitive snubbers which holds an overcharge following the transfer of energy to the dc supply, and dissipating the magnetizing current of the recovery transformer to reset the recovery transformer following the transfer of energy to the dc supply.

Apparatus for restoring snubber energy to the dc source comprises first and second switching devices and first and second feedback diodes in anti-parallel with the first and second switching devices. Each of the switching devices is connected to a series inductive snubber and a shunt capacitive snubber. The primary winding of a recovery transformer couples the first shunt capacitive snubber to the second shunt capacitive snubber and a secondary winding of the transformer is coupled across the dc source. A recovery diode connected in series with a secondary winding directs recovered energy to the dc source. First and second unidirectional conducting devices polarize the charging and discharging of the snubbers. The apparatus further includes a reset branch coupled in parallel with the primary winding and including a reset resistance connected in series with a reset diode. The reset branch may further include a reset capacitor coupled across the reset resistance or at least one more diode connected in series with the reset diode.

DETAILED DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 3 is a schematic diagram of another embodiment of the circuit shown in FIG. 2.

FIG. 4 is a schematic diagram of yet another embodiment of the circuit in FIG. 2.

FIG. 5 is a schematic diagram of an embodiment of the circuit in FIG. 2 including a decoupling switch connected to the energy recovery transformer.

FIG. 6A is a schematic diagram of another embodiment of the circuit of FIG. 2, and FIG. 6B shows the trigger circuit of FIG. 6A in greater detail.

DETAILED DESCRIPTION OF THE INVENTION

Figure 1:
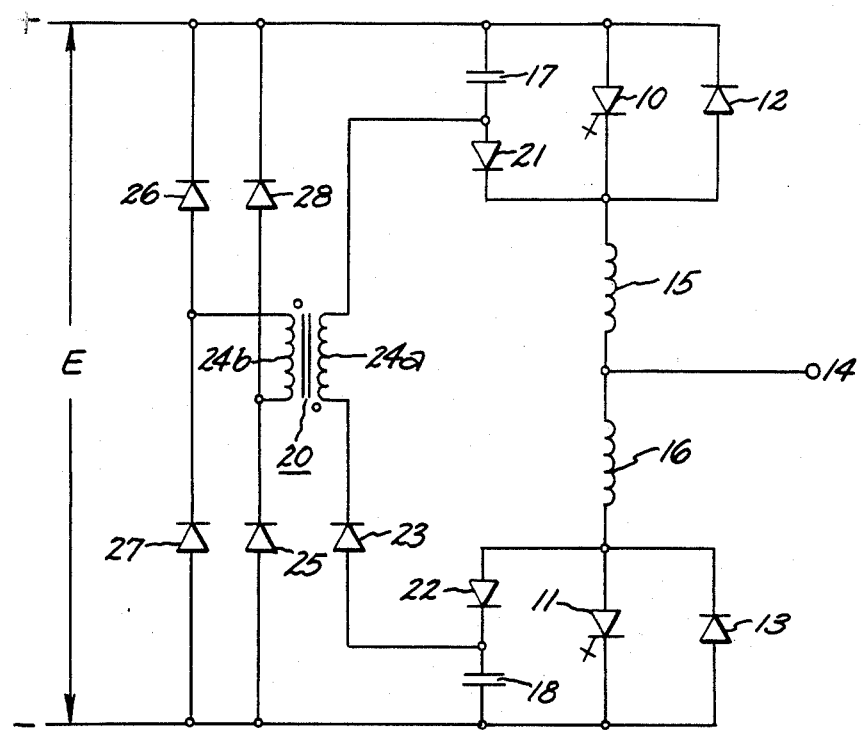
FIG. 1 is a schematic diagram showing a prior art snubber configuration with an energy recovery transformer.

A known snubber configuration which is shown by T. Asaeda et al. in "DC-to-AC Power Converter for Fuel Cell System", Conference Record of Fifth International Telecommunications Energy Conference, October, 1983, pages 84–91, is illustrated in FIG. 1. A pair of switching devices 10 and 11 are coupled in series across a source of dc voltage E. A feedback diode 12 is coupled in anti-parallel with switch 10 and a feedback diode 13 is coupled in anti-parallel with switch 11. The output of this single leg of a converter is taken at terminal 14. Reactors 15 and 16 are series inductive snubbers which limit di/dt during turn on of a respective switching device 10 or 11. Capacitors 17 and 18 comprise shunt capacitive snubbers which limit dv/dt during the turn-off of a respective switching device 10 or 11. The charging and discharging of the snubbers is polarized by diodes 21 and 22 connected as shown. Following a commutation of either switching device 10 or 11, snubber energy circulates through diode 23 and primary winding 24a of recovery transformer 20. Thus, the energy is transferred to secondary winding 24b and to the dc supply through diodes 25 and 26 of a diode rectifier comprising diodes 25–28. The pair of diodes 27 and 28 places a maximum limit on the reset voltage of the transformer, i.e. the reverse voltage across the transformer following an energy recovery, while diode 23 increases the actual or threshold reset voltage. As previously described, the long reset times resulting from the configuration shown in FIG. 1 limits the maximum frequency of operation of the power converter. The above-mentioned reference contains a detailed description of the circuit shown in FIG. 1.

Figure 2:
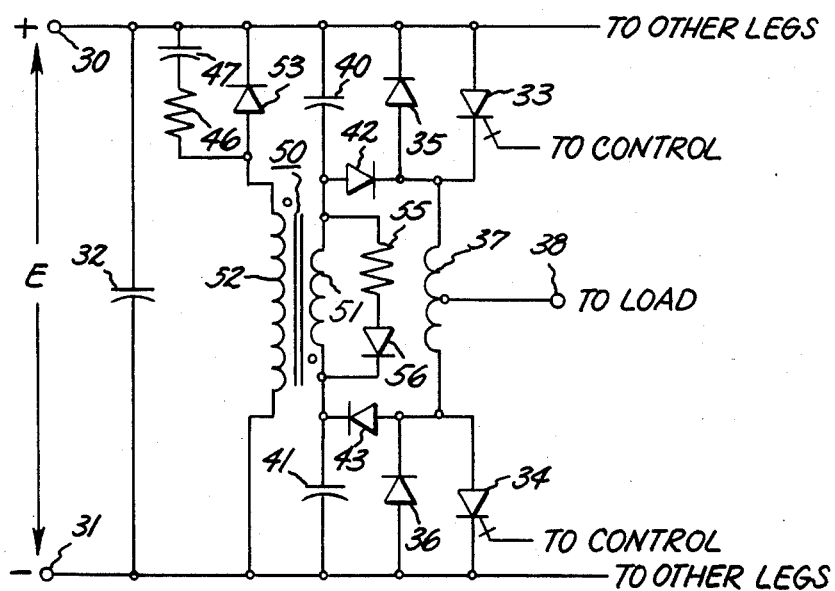
FIG. 2 is a schematic diagram of an improved snubber configuration according to the present invention.

A first embodiment of the present invention is shown in the schematic diagram of FIG. 2. As in FIG. 1, only a single leg of the converter is shown, it being understood that each of the other legs of the converter are identical. A dc supply voltage E is provided across terminals 30 and 31 and is filtered by a dc filter capacitor 32. GTOs 33 and 34 comprise the main switching devices of the leg and are coupled in series across the dc supply. The gates of GTOs 33 and 34 are connected to a control circuit (not shown) which is known in the art, such as a pulse-width modulation (PWM) control circuit. Feedback diodes 35 and 36 are coupled in anti-parallel with GTOs 33 and 34, respectively. A center tapped inductor 37 is connected between GTOs 33 and 34 with the center tap of inductor 37 providing an output terminal 38 of the leg shown. Thus, each half of center tapped inductor 37 provides a series inductive snubber for GTOs 33 and 34, respectively.

A capacitor 40 is coupled across GTO 33 for providing a first shunt capacitive snubber and a capacitor 41 is coupled across GTO 34 for providing a second shunt capacitive snubber. A pair of diodes 42 and 43 are connected to capacitors 40 and 41, respectively, in series-aiding fashion with diodes 35 and 36, respectively, to polarize the charging and discharging of the inductive and capacitive snubbers.

An energy recovery transformer 50 couples the inductive and capacitive snubbers to the dc supply. Primary winding 51 couples capacitor 40 to capacitor 41. Secondary winding 52 is connected in series with a diode 53 across the dc supply. A capacitor 47 and resistor 46 comprise a snubber for diode 53. Energy recovery transformer 50 is wound such that an increasingly positive current entering the dotted terminal of the primary winding induces a positive voltage at the dotted terminal of secondary winding 52.

Due to the action of diodes 42 and 43, snubber energy following a commutation of the converter leg flows through primary winding 51 of energy recovery transformer 50. Energy is fed back to the dc supply during intervals that diode 53 conducts.

When the period of energy recovery ends with diode 53 blocking as a result of the decreasing voltage across secondary winding 52, current will be flowing through primary winding 51, diodes 42 and 43 and inductor 37, and there will be an overcharge on one of the capacitors 40 or 41. During a commutation where a GTO is turned on, the overcharged capacitor will be the one across the other GTO, i.e. the one not turning on. During commutation where a GTO is turned off, the overcharged capacitor will be across the GTO which is switching off. The energy associated with the circulating current and the capacitor overcharge remains trapped and is not recoverable.

Oscillations on the primary side of energy recovery transformer 50 following the period of energy recovery will quickly reduce the current in inductor 37 and the diode 42 or 43 which is connected to the overcharged capacitor 40 or 41, respectively, will become nonconductive. This will leave the overcharged snubber capacitor in oscillation with the magnetizing inductance of primary winding 51 via the diode 42 or 43 which still conducts. The voltage on the overcharged capacitor will swing from overcharge to undercharge, reversing the voltage on transformer primary 51 and beginning the reset of transformer 50.

It is desirable to make the resetting oscillation of the overcharged capacitor near-critically damped so that the reset time is minimized and so that no energy remains to cause the voltage to swing forward again. This near-critical damping is achieved according to the present invention by connecting the series connected pair of reset resistor 55 and reset diode 56 in parallel with primary winding 51.

When the voltage across transformer primary winding 51 reverses, current begins to flow through reset resistor 55 and reset diode 56. Near-critical damping of the oscillation between the overcharged capacitor and the primary winding 51 can be achieved by selecting the value of resistor 55. Thus, the resistance of resistor 55 should be less than $\frac{1}{2}\sqrt{L_N/C_S}$, where $L_N$ is the magnetizing inductance of transformer 50 as measured from the primary winding 51 and $C_S$ is the capacitance of the snubber capacitor.

Reset diode 56 provides a reset threshold voltage for faster reset, i.e. dissipation of the transformer magnetizing current. By causing the transformer to reset more quickly, the converter may be operated at a higher frequency while still maintaining energy recovery.

FIG. 3 shows a modification of the circuit in FIG. 2 wherein an even higher reset voltage threshold is used to provide for an even faster reset of the energy recovery transformer. Thus, two additional reset diodes 57 and 58 are connected in series with reset diode 56. The reset voltage equals the voltage drop across the reset resistor (the resistance of resistor 55 times the magnetizing curren) plus the voltage drop across the reset diode or diodes. However, this reset voltage is limited by the voltage at which diodes 42 and 43 will again begin conducting. Thus, the reset branch comprising the reset resistor and the reset diode or diodes can damp the oscillations between the overcharged capacitor and the primary winding of the transformer while the magnetizing current of the transformer may be dissipated either in the reset branch or in diodes 42 and 43 and center tapped inductor 37, depending on the threshold voltage of the reset branch. The use of three reset diodes as shown in FIG. 3 insures that the magnetizing current is dissipated in diodes 42 and 43 and inductor 37 since the latter components will conduct first.

FIG. 4 shows another modification of the circuit in FIG. 2 for increasing the threshold voltage of the reset branch without the addition of more reset diodes. In this case, the voltage of the reset branch is increased by increasing the value of the resistance of resistor 55. The increase in resistance requires the use of a relatively large capacitance provided by capacitor 60 connected in parallel with resistor 55. Capacitor 60 is preferably a low voltage electrolytic capacitor. It will absorb transient pulses of current that occur when reset begins and will then act as a quasi-voltage source.

It is possible to achieve a higher reset threshold voltage by decoupling the transformer primary from the snubbers and snubber diodes 42 and 43 as shown in FIG. 5. Thus, a reset GTO 65 is connected in series with primary winding 51. Reset GTO 65 should be turned on during each commutation, allowing snubber action and energy recovery to proceed normally. After diode 53 blocks and the oscillations of the overcharged capacitor have been damped (i.e. the current in primary winding 51 is reduced to the transformer magnetizing level), reset GTO 65 is switched off. This forces the magnetizing current of the transformer into the reset branch through resistor 55 and diode 56, thus assuring fast reset of the transformer.

Control of reset GTO 65 is provided by a gate driver A such that reset GTO 65 is off during transformer reset and is otherwise on. Gate driver A is connected between the gate and cathode of reset GTO 65 and has a configuration known in the art. Gate driver A may also comprise an improved gate driver circuit as shown in copending application Ser. No. 565,304, filed Dec. 27, 1983 by the same inventor as the instant application and assigned to the instant assignee.

Reset GTO 65 may be relatively small since it is subjected to only a fraction of the DC source voltage and its average current is low. Since the current in reset GTO 65 is only the magnetizing current of the transformer at the turn-off of reset GTO 65, it may be successfully switched without a snubber.

A circuit similar to that in FIG. 5, but having ordinary thyristors rather than a reset GTO is shown in FIG. 6A. Thyristors 66 and 67 replace diodes 42 and 43 of FIG. 2 to take advantage of the fact that one or the other of diodes 42 and 43 is reverse-biased following the period of energy recovery. Therefore, it is possible to reliably turn off an ordinary thyristor to decouple primary winding 51 from the snubbers without a turn-off gate circuit. Gate circuits B, one of which is shown in detail in FIG. 6B, are provided for thyristors 66 and 67. Each gate circuit comprises a zener diode 70, resistors 71 and 72, capacitor 73 and a diode 74. The series combination of zener diode 70 with the parallel-connected pair of resistor 71 and capacitor 73 is coupled between the gate and the anode of each thyristor. The parallel-connected pair of resistor 72 and diode 74 is coupled between the gate and cathode of each thyristor. Zener diode 70 may typically have a breakdown voltage of 33 volts. Other typical values for gate circuit B are 0.05 microfarads for capacitor 73, 100 ohms for resistor 71 and 47 ohms for resistor 72. Series connected diodes 68 and 69 are each connected to one of the gate circuits B, as shown in FIG. 6A. In operation, one of the thyristors 66 and 67 will turn off following a period of energy recovery and the magnetizing current of the transformer is dissipated in the reset branch comprised of resistor 55, diode 56 and capacitor 60. Gate circuit B is also suitable for use as the turn-on portion of gate circuit A in FIG. 5.

The foregoing describes a method and circuits for improving the resetting of an energy recovery transformer in a dc-ac converter. In converters using the circuits of the present invention, chopping frequencies of the converter in excess of 250 hertz are obtainable without saturating the recovery transformer. This extends the operating range of the recovery transformer to near the practical frequency limit for present GTO devices, which results from their internal switching losses.

While preferred embodiments of the present invention have been shown and described herein, it will be obvious to those skilled in the art that such embodiments are provided by way of example only. Numerous variations, changes and substitutions will now occur to those skilled in the art without departing from the invention. Accordingly, it is intended that the invention be limited only by the scope and spirit of the appended claims.

What is claimed is:

1. A method for restoring snubber energy in a leg of a power converter to a DC supply following commutation of said leg, said leg including first and second switching devices coupled in series and first and second feedback diodes coupled in anti-parallel with said first and second switching devices, respectively, said first and second switching devices, respectively, being coupled to a first and a second series inductive snubber, respectively, and to a first and a second shunt capacitive snubber, respectively, said leg further including a recovery transformer coupling said series inductive and said shunt capacitive snubbers to said DC supply, first and second unidirectional conducting devices for polarizing the charging and discharging of said snubbers, and a reset branch comprising a resistor and a diode connected across the primary winding of said transformer, said method comprising the steps of:
    transferring snubber energy from said snubbers to said DC supply through said recovery transformer;
    damping out oscillations between said recovery transformer and the one of said first and second shunt capacitive snubbers which holds an overcharge following the transfer of energy to said DC supply, the resistance of said resistor causing near-critical damping of said oscillations; and
    dissipating the magnetizing current of said recovery transformer in said reset branch to reset said recovery transformer following the transfer of energy to said DC supply.

2. In a DC source fed power converter, a leg connected across said DC source comprising:
    first and second switching devices coupled to opposite sides of said DC source, respectively;

first and second feedback diodes each coupled in anti-parallel with said first and second switching devices, respectively;

first and second series inductive snubbers connected to said first and second switching devices, respectively;

first and second shunt capacitive snubbers connected in parallel with said first and second switching devices, respectively;

a recovery transformer for restoring snubber energy to said DC source following a commutation of said leg, the primary winding of said transformer coupling said first shunt capacitive snubber to said second shunt capacitive snubber, the secondary winding of said transformer being coupled to one side of said DC source;

a recovery diode coupling said secondary winding to the other side of said DC source;

first and second unidirectional conducting devices for polarizing the charging and discharging of said series and said shunt snubbers, said first unidirectional conducting device coupling the junction of said first shunt capacitive snubber and said primary winding to said first series inductive snubber, and said second unidirectional conducting device coupling the junction of said second shuntcapacitive snubber and said primary winding to said second series inductive snubber; and a reset branch coupled in parallel to said primary winding and including a reset resistance connected in series with a reset diode, said reset branch providing substantially near-critical damping of oscillations between said capacitive snubbers and said primary winding of said recovery transformer.

3. The power converter of claim 2 wherein said first and second switching devices comprise gate turn-off thyristors.

4. The power converter of claim 2 wherein said first and second unidirectional conducting devices comprise diodes.

5. The power converter of claim 2 wherein said reset branch further comprises a reset capacitor coupled across said reset resistance.

6. The power converter of claim 2 wherein said reset branch further includes at least one more diode connected in series with said reset diode.

7. The power converter of claim 2 wherein said first and second unidirectional conducting devices are comprised of thyristors and wherein said leg further comprises first and second gating circuits connected to the gates of said thyristors, respectively, and coupled across each of said thyristors, respectively, for providing a low voltage threshold trigger for each.

8. The power converter of claim 4 further comprising:

a reset gate turn-off thyristor connected in series with said primary winding for decoupling said recovery transformer from said series inductive and said shunt capacitive snubbers during reset; and a gate driver connected between the gate and the cathode of said reset gate turn-off thyristor for rendering said reset gate turn-off thyristor non-conductive during reset of said recovery transformer and conductive at other times.

* * * * *